BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1021

T-856.046

678,114

POLYESTER TEXTILE MATERIALS DYED WITH ANTHRAQUINONE DYES

James M. Straley, Ralph R. Giles, and David J. Wallace, all % Tennessee Eastman Company, P.O. Box 511, Kingsport, Tenn. 37662

Filed Oct. 25, 1967. Published Nov. 26, 1968

Class 8—39

No Drawing. 13 Pages Specification

Polyester textile materials dyed with an anthraquinone dye having a substituted or unsubstituted sulfamoyl group at the 2-position.